Figure 10:
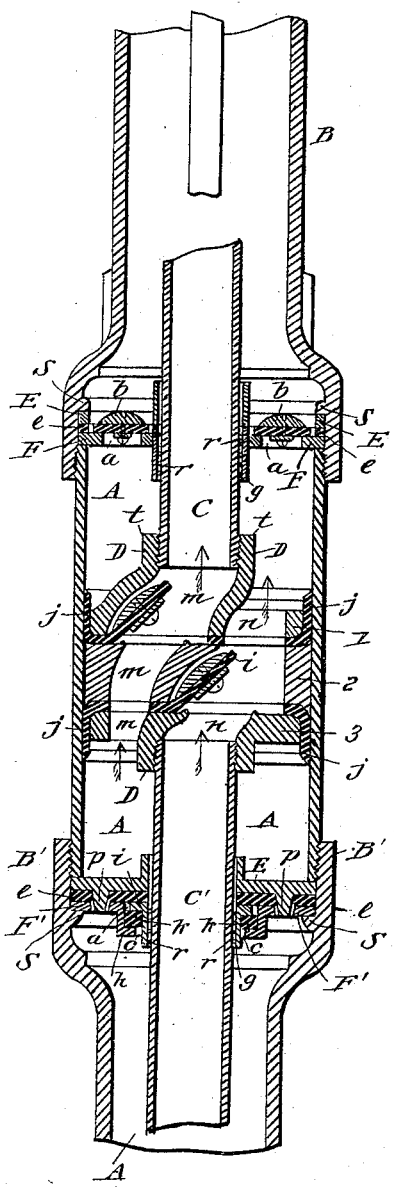

(No Model.) 3 Sheets—Sheet 1.
G. S. PUTNAM.
PUMP.
No. 358,570. Patented Mar. 1, 1887.
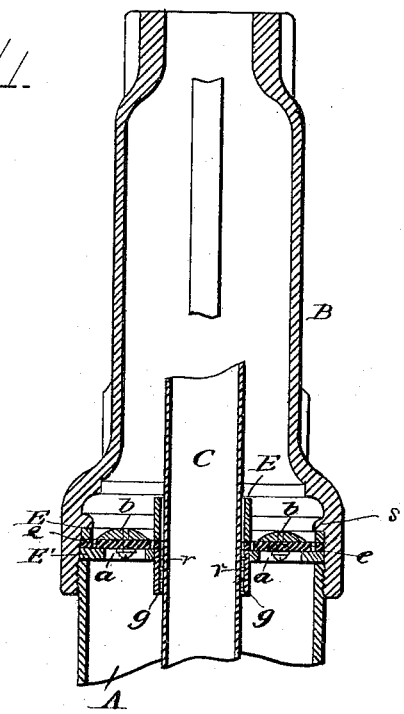
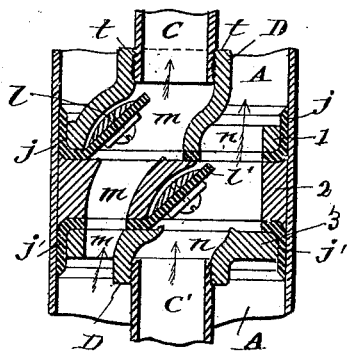
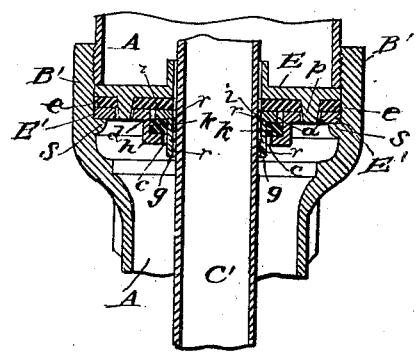
WITNESSES.
Norris A. Clark
J. R. Drake.
INVENTOR.
George S. Putnam
By J. R. Drake,
Atty.

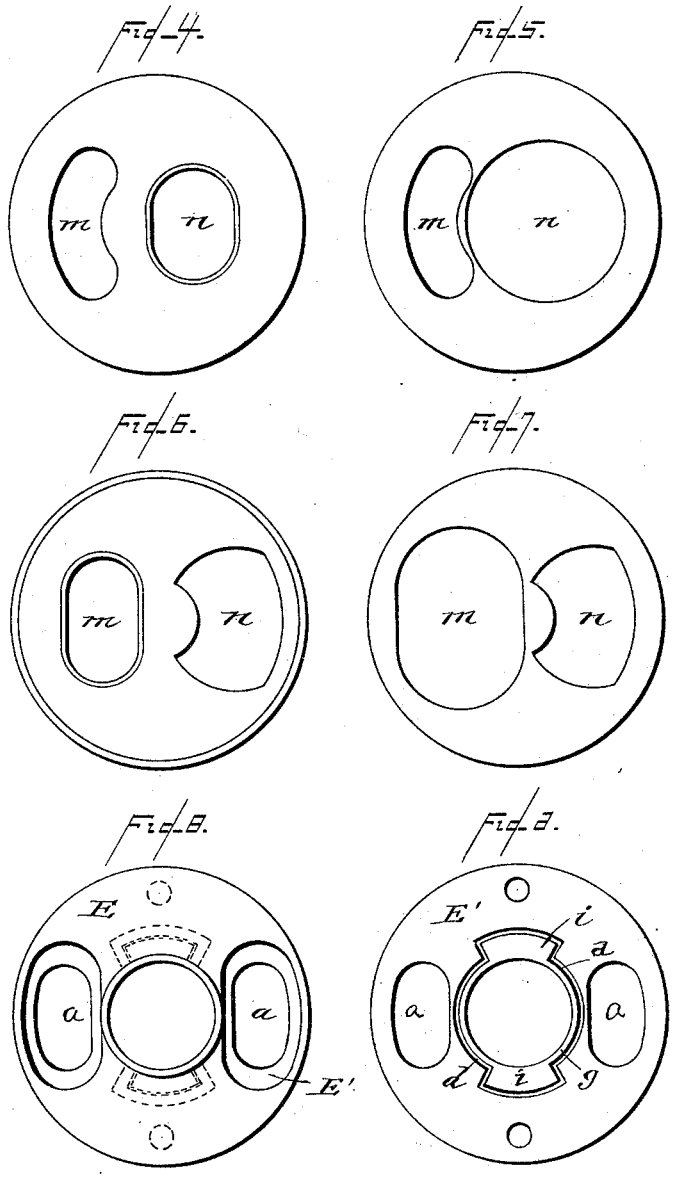

(No Model.)  3 Sheets—Sheet 3.

G. S. PUTNAM.
PUMP.

No. 358,570.  Patented Mar. 1, 1887.

Witnesses.
Norris A. Clark.
Geo. A. Burnett.

Inventor
Geo. S. Putnam
By J. R. Drake
Attorney

UNITED STATES PATENT OFFICE.

GEORGE S. PUTNAM, OF BUFFALO, NEW YORK, ASSIGNOR TO ROBERT C. HICKOK AND EMMA J. PUTNAM, BOTH OF SAME PLACE.

PUMP.

SPECIFICATION forming part of Letters Patent No. 358,570, dated March 1, 1887.

Application filed November 11, 1886. Serial No. 218,566. (No model.)

*To all whom it may concern:*

Be it known that I, GEORGE S. PUTNAM, a citizen of the United States, residing at Buffalo, in the county of Erie and State of New York, have invented certain new and useful Improvements in Pumps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to combine a double-acting pump in a single cylinder and without using outside water-ways, giving the suction and discharge at the same time; and the invention consists, mainly, in a hollow plunger and the arrangement of valves connected therewith, all as hereinafter fully set forth and claimed.

In the drawings, Figure 1 is a vertical cross-section through the upper part of the pump; Fig. 2, a central vertical cross-section of the pump, broken from the upper and lower sections, and showing the main features of the plunger; Fig. 3, a vertical cross-section of lower part of pump, broken from the central part, but showing it in a line cut across opposite to that in Figs. 1 and 2; Figs. 4, 5, 6, and 7, details of the disks with their openings, forming part of the plunger; Fig. 8, a top plan of the stationary disks of Figs. 1 and 3; and Fig. 9, a top plan of the lower disk of Fig. 8, showing valve-seats, openings, and glands; Fig. 10, a vertical cross-section of the whole device.

A represents the cylinder-case in all the figures, and B B' the two heads, made alike and screwed outside on the ends of the cylinder.

C is a hollow tube forming part of the plunger, made in two sections—C, the upper part, screwed into the plunger proper, D, above, and C', the lower part, screwed into the lower part of plunger D, as shown in Fig. 2. The lower part of the hollow plunger C' works into a hollow pipe (not shown) that leads into the well, which will be screwed to the lower head, B', and the same arrangement will be made above in head B, and a plunger-rod will be screwed to the top of plunger-tube C.

In Fig. 1 two disks are shown in central cross-section in position, secured in and on top of the cylinder A. The upper one, E, (shown in plan, Fig. 8,) has two oval openings, $a\ a$, for the play of the valves $b\ b$, which are formed in or are a part of the leather disk or packing $e$, which is set between the upper disk, E, and lower disk, F, the latter having raised rims thereon, forming valve-seats and openings $a\ a$, corresponding to those above, into the cylinder A below, forming water-ways.

$g\ g$, Figs. 1, 3, and 9, show the downwardly-projecting loose gland $o$ set in lower disk F and surrounding the hollow plunger C C', having a series of annular depressions or longitudinal rings, $r\ r\ r$, for holding water therein, making a water packing. This gland has ears $i\ i$, as shown in Figs. 3 and 9, and dotted lines, Fig. 8, which set loosely in seats $h\ h$, formed in and on the lower disk F, having an interposed rubber packing, $k$, between, as shown in Fig. 3, but leaving a vertical space, $c$, between the inner vertical edge of the seats $h$ and gland $g$, and a vertical space, $d$, between the upper part of the socket and edge of ears $i\ i$. These small spaces $c$ and $d$ are to allow for clearance between the outside of plunger C C' and the disk which holds the glands, and is important in connection with the fitting of said glands in the seats in the under disk F, for the purpose of getting a perfect self-centering of the plunger, when, in consequence of the wear of the leathers $j\ j'$, forming the cup between the sides of the cylinder A and plunger D, the plunger works unevenly, as will be the case. The loose gland $g$, moving or rocking with the plunger C C', overcomes this by the slight lateral motion allowed by the spaces $c\ d$, and makes the plunger work with a perfect vertical action. This prevents the pump cramping.

The foregoing description of disks E F, leather packing, valves, glands, seats, &c., applies equally to those in the lower part of the cylinder, being precisely the same in construction and working. These disks are kept rigidly in place as follows: As shown in Fig. 3, the upper disk E has cast on the under side a dowel, $p$, which projects through disk F below. The two disks are set inside the lower head, B′, on a rib or bead, s; then the cylinder A is screwed into the head and down on the top disk E, pressing the disks firmly together and keeping them in place in the pump, the dowels $p\ p$ preventing any lateral sliding out of place. In the upper head, B, the disks are first set on top of the cylinder A, and the head B is screwed therein, bringing rib s tightly against the disks.

The plunger proper, D, is constructed in three parts or disks, the top disk, 1, having the hollow plunger C screwed thereto in the center in a raised rim, t, and which curves from the center to the side, as shown in Fig. 2, and giving a passage, m, downward through a leather packing, j, (interposed between parts 1 and 2 and up around the side of disk 1, forming a cup-packing). Out of this leather ring or packing the valve l is wholly or partly formed, and which opens and closes the water-passage m, leading above into the hollow plunger and down through disks 2 and 3 into the cylinder A. Another opening is made in the disk opposite that just described, also in ring j, giving a water-passage, n, into the cylinder A, all around the hollow plunger C, and continuing down, through disks 1 2 3, into the hollow plunger C′. (See Fig. 7 for bottom view of disk 1 and its openings.) Next below the leather valve ring $l\ j$ is disk 2, having a raised valve-seat in connection with valve l and water-way m; and opposite is the opening for water-way n and working of valve l′, made of the leather packing-ring j′, said valve rising and falling in said opening and closing on a raised seat on disk, 3, below. The packing-ring j′ also is formed into a cup outside of disk 3, between it and cylinder A. (See Figs. 5 and 6 for plan of top and bottom and openings in disk 2.)

Disk 3 has a water-way, m, in connection with those in disks 1 and 2, and another, n, in connection with those above, as described, and which curves to the center and there receives hollow plunger C′, which is screwed therein, as shown. The course of the water is shown by arrows. These sections or disks 1 2 3 are firmly bolted together, the hollow plunger screwed thereto, as described, and, in connection with the valves and openings $m\ n$, give the double action in a single cylinder.

If desired, ball-valves may be used instead of flap-valves, and which may be done by merely changing the construction of the seats.

The operation of the pump is as follows: When the plunger is forced down, it opens the valves $l\ l'$ in the plunger proper, D, as in Fig. 2. The valves in the upper disks E F are held closed by the volume of water above and vacuum below the valves in main cylinder A, and the valves in the lower disks E F are also kept closed by the pressure of the water below the plunger proper, D. The water now rushes up through the lower part of the hollow plunger C′ and through openings n and valve l′ in plunger proper, D, and fills the space above plunger D and around hollow plunger C, below the valves in disks E F above. Meanwhile the pressure of the water in the cylinder below the plunger proper, D, opens the valve l in said plunger, which allows the water to rush up through hollow plunger C and exit at the top, as is usual. The upward stroke of the plunger closes the two valves $l\ l'$ and opens valves $b\ e$ in the top disks E F and also in the corresponding bottom disks. The upper valves are opened by the water in the space around the plunger C, being forced up by the upward action of the plunger proper. The lower valves are opened upward by the vacuum formed in the cylinder by the plunger proper rising therein.

The whole device is perfectly simple and effective, giving force, volume, and steady action throughout, and by the simple up and down stroke two suctions and two discharges are obtained—a result never before accomplished in a single-cylinder pump, so far as I am acquainted. This is owing mainly to the employment of a hollow plunger, which is the great feature in this pump.

It is obvious that by removing the valves $l\ l'$ in the plunger proper, D, and putting a valve in the top of hollow plunger C and another in the bottom of said plunger C′, the same effect could be attained; but at present I prefer the valves as hereinbefore described and placed.

I claim—

1. In a pump, the combination, with a single cylinder, A, and heads B B′, of the hollow plunger C C′, the plunger proper, D, attached thereto and consisting of the parts 1 2 3, fastened together, having water-ways $m\ m$ leading from the lower part of cylinder A into the hollow plunger C above and openings $n\ n$ leading from the hollow plunger C′ below into cylinder A above plunger D, the interposed leather packing-rings and valves $l\ l'$, constructed in connection therewith, and the upper and lower disks, E F, having interposed leather packing-rings e and valves $b\ b$, water-openings $a\ a$, and glands $g\ i\ i$ in seats $h\ h$ in the lower part of disks F, all constructed, arranged, and operating substantially as set forth.

2. In a single-cylinder double-acting pump, the combination, with the hollow plunger C C′, of the disks E F, situated above and below the plunger proper, D, as described, and having the loose glands $g\ g$, with ears $i\ i$ setting in sockets $h\ h$, with interposed rubber packing $k\ k$, and the centering and clearance spaces $c\ d$ between the glands and lower disk F, all substantially as and for the purpose specified.

In testimony whereof I affix my signature in presence of two witnesses.

GEORGE S. PUTNAM.

Witnesses:
J. R. DRAKE,
GEO. A. BURNETT.